July 24, 1956  G. H. MULLER  2,755,875
INDEPENDENT WHEEL SUSPENSION FOR MOTOR VEHICLES
Filed Oct. 12, 1953

G. H. MULLER
INVENTOR.

BY E. C. McRae
J. R. Faulkner
D. H. Oster
ATTORNEYS

United States Patent Office 2,755,875
Patented July 24, 1956

2,755,875
INDEPENDENT WHEEL SUSPENSION FOR MOTOR VEHICLES

George H. Muller, Northville, Mich., assignor to Ford Motor Company, Dearborn, Mich., a corporation of Delaware Application October 12, 1953, Serial No. 385,318

5 Claims. (Cl. 180—73)

This invention relates generally to motor vehicles, and has particular reference to an independent wheel suspension for a motor vehicle.

It is an object of the present invention to provide a motor vehicle wheel suspension in which a pair of torsion bars cooperate to guide the rising and falling movements of the vehicle wheel and to take the various loads to which the wheel is subjected, as well as to form the spring suspension therefor. In an embodiment of the invention this is accomplished by providing a longitudinally extending torsion bar pivotally connected at its forward end to the vehicle frame for pivotal movement about a generally horizontal transversely extending axis and rigidly connected at its rearward end to the wheel supporting member, and by providing a generally diagonally extending torsion bar rearwardly of the axis of the wheel rigidly connected at its laterally outer and forward end to the wheel supporting member and at its laterally inner and rearward end to the vehicle frame. The two torsion bars cooperate to guide the wheel in its rising and falling movements, and the arrangement is such that both bars are torsionally stressed as the wheel rises and falls so as to form the spring suspension for the wheel.

Although the independent suspension system of this invention can be utilized with a vehicle wheel which is not power driven, it is particularly suitable for use in connection with driven wheels such as the rear wheels of a conventional motor vehicle. In this instance the differential and driving gear housing may be mounted directly upon the vehicle frame with power being transmitted to the wheels through axle shafts provided with universal joints. The geometry of the construction may be such that the pivotal connection between the forward end of the longitudinally extending torsion bar and frame is in alignment with the universal joint between the axle shaft and differential unit and with a portion of the rear diagonally extending torsion bar. This arrangement forms a triangulated system providing oscillation about a diagonally extending axis formed by these aligned connections and the portion of the rear torsion bar.

The road wheels at opposite sides of the vehicle are provided with identical suspension systems, and the diagonally extending torsion bars for the two wheels cross each other substantially on the longitudinal center line of the vehicle. Each of the bars is generally L-shaped, having a forward transversely extending section rigidly connected at its outer end to the wheel supporting member and a diagonally rearwardly extending section anchored at its rearward end to the rear frame cross member. In addition, the rear diagonally extending section of each bar is provided with a bearing located forwardly of the crossover between the two bars and forming a journal support for the rearward portion of the bar. A common frame supported bracket carries the bearing means for the two bars.

Other objects and advantages of this invention will be made more apparent as this description proceeds, particularly when considered in connection with the accompanying drawings, wherein.

Figure 1:
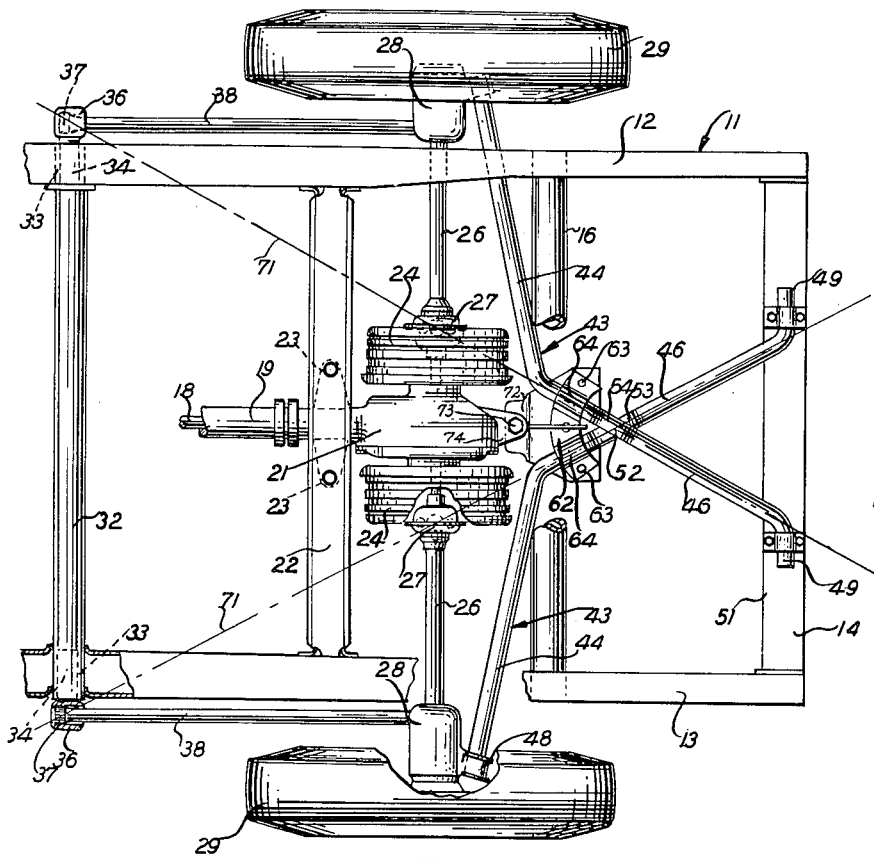
Figure 1 is a plan view of the rearward portion of a motor vehicle chassis embodying the present invention.

This application constitutes a modification of the copending application of E. S. MacPherson, Serial No. 362,510, for Independent Wheel Suspension For Motor Vehicles, and is assigned to the assignee of the MacPherson application.

Referring now to the drawings, the reference character 11 indicates generally the frame of a motor vehicle having side frame rails 12 and 13 joined at their rearward ends by a cross frame member 14. Spaced forwardly of the rear cross frame member 14 is another cross frame member 16 extending generally transversely of the vehicle and secured at its outer end to the side frame rails. The cross frame member 16 is tubular in cross section.

Power from the vehicle engine (not shown) is transmitted through a propeller shaft 18 contained within a torque tube 19 to conventional differential and drive gearing contained within a central housing 21. The central housing 21 is resiliently supported upon the cross frame member 22 of the vehicle chassis 11 by means of resilient mounts 23.

The differential housing 21 supports conventional brake units 24 on opposite sides thereof. A pair of driven axial shafts 26 are connected by universal joints 27 to the differential and drive gear assembly 21, and extend outwardly to wheel supporting members or hubs 28 for the rear wheels 29. The stub axle shafts 26 are journaled in the wheel hubs 28 and connected to the rear wheels 29 to rotate the latter.

As best seen in Figure 1, the side frame rails 12 and 13 are apertured to receive the ends of a tubular cross member 32. The ends of the tubular member 32 extend through the box section side frame rails and are welded thereto. Adjacent each end the tubular member 32 supports a bearing 33 which rotatably supports the shank 34 of a torsion bar end support 36.

Figure 2:
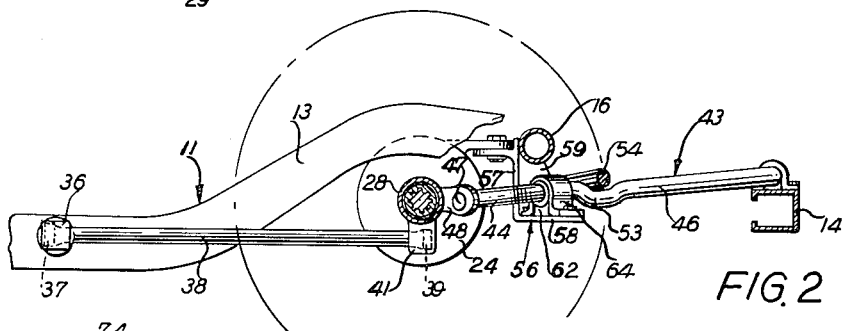
Figure 2 is a side elevation of the construction shown in Figure 1, partly broken away and in section.

The end support 36 nonrotatably receives the splined end portion 37 of a longitudinally extending torsion bar 38. It will thus be seen that the forward end of the longitudinally extending torsion bar 38 is mounted for rotation in a vertical plane about a horizontal transverse axis. As seen in Figure 2, the rearward end 39 of the longitudinally extending torsion bar 38 is also splined and nonrotatably received wtihin an integrally formed downwardly projecting extension 41 of the wheel hub 28. The construction of the mounting bar 38 and its end connections are the same as those shown in the said copending application.

A rear diagonally extending torsion bar 43 is also provided for each rear wheel 29. As best seen in Figure 1, each torsion bar 43 is generally L-shaped and comprises a pair of integral sections 44 and 46. The section 44 extends generally transversely of the vehicle frame and is rigidly connected at its outer end of the wheel hub 28, being received within a bore 47 formed within an integral rearwardly projecting extension 48 of the wheel hub 28 and welded or otherwise nonrotatably secured thereto.

The rearward portion 46 of the torsion bar 43 is angularly related to the section 44 thereof and extends diagonally rearwardly of the vehicle frame with its terminal end portion 49 being bent laterally outwardly and overlying the rear frame cross member 14. A bracket 51 is mounted upon the cross member 14 adjacent the terminal end portion 49 of the torsion bar to provide an anchor therefor.

Figure 3:
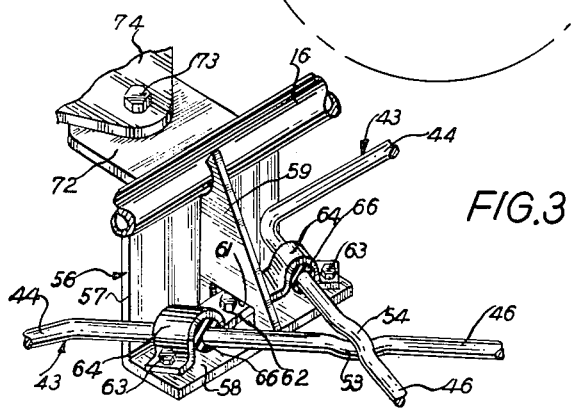
Figure 3 is a fragmentary perspective view of adjacent portions of the diagonally extending torsion bars and their journal mountings.

Inasmuch as each rear wheel 29 is provided with an identical independent suspension system, the rear diagonally extending portions 46 of the torsion bars 43 cross each other at a point 52 which is on the longitudinal center line of the vehicle. As best seen in Figures 2 and 3, this crossover is effected without interference by providing a depressed portion 53 for the torsion bar for the left rear wheel 29 and a raised portion 54 for the torsion bar for the right rear wheel. Clearance is thus provided between the torsion bars 43 for the rear wheels so that each may operate independently of the other.

Means are provided for journaling the forward portions of the rear sections 46 of the torsion bars 43. Figures 1, 2 and 3, and particularly Figure 3, illustrate this construction. A supporting bracket 56 is secured to the tubular cross frame member 16 centrally of the vehicle. The bracket 56 has a vertical flange 57 having its upper edge welded to the underside of the tubular cross frame member 16, and a horizontally extending lower flange 58 formed integrally with the vertical flange 57. The two flanges are braced by means of a vertically longitudinally extending web 59 welded at its upper edge to the tubular cross frame member 16 and at its forward and lower edges to the vertical and horizontal flanges 57 and 58 of the supporting bracket 56.

The vertical web 59 is formed with an opening 61 therethrough to permit an arcuate one-piece hanger 62 to be secured by means of bolts 63 to the horizontal flange of the supporting bracket 56. On opposite sides of the vertical web 59 the hanger 62 is formed with arcuate portions 64 receiving rubber bushings 66 which in turn journal the forward portions of the rear sections 46 of the torsion bars 43.

With reference to Figures 1 and 3, the supporting bracket 56 is formed with a forwardly extending horizontal flange 72 connected by means of a rubber insulated bolt 73 to a rearwardly extending flange 74 integrally formed with a differential housing 21. This construction cooperates with the mounts 23 on the cross frame member 22 to resiliently support the differential housing 21 and brake unit 24 on the vehicle frame.

Upon reference to Figure 1 it will be noted that the rearward section 46 of each torsion bar 43 is axially aligned along a line 71 with the center of the universal joint 27 and with the center of the pivotal connection between the forward end of the longitudinally extending torsion bar 38 and the tubular cross member 32. Each rear wheel suspension system thus is in the form of a triangle having its base formed by the line 71 and with the longitudinally extending torsion bar 38 and the forward section 44 of the diagonally extending torsion bar 43 forming the two short sides of the triangle. The rear wheel 29 is supported by the wheel hub 28 substantially at the juncture between the two short sides of the triangle.

As a result of this arrangement rising and falling movement of each rear wheel 29 takes place about its axis 71. Consequently movement of the wheel hub 28 is in an arc about the inclined axis 71, and since the forward end 37 of the longitudinally extending torsion bar 39 is pivotally connected to the side frame rail for pivotal movement only about the fixed horizontal transversely extending axis of the tubular member 32 it will be apparent that the torsion bar 38 is torsionally stressed as the wheel rises and falls since the rearward end 39 of the torsion is rigidly connected to the wheel hub 28 and swings in an arc about the axis 71. Consequently, the longitudinally extending torsion bar 38 functions as a spring to resiliently suspend the rear wheel. In addition, the arcuate movement of the wheel hub 28 about the inclined axis 71 results in imposing torsional stresses in the rear diagonally extending torsion bar 43, and particularly in the rear section 46 thereof. In this respect the forward section 44 of the diagonally extending torsion bar 43 acts as a lever arm to transmit movement to the rear section 46 which is anchored at its rearward end to the rear frame cross member 14 and journaled at its forward end in the rubber bushing 66 supported on the supporting bracket 56 by means of the hanger 64. In addition, the forward section 44 is subjected to some torsional stress during the rising and falling movement of the wheel.

Since the universal joint 27 between the rear axle shaft 26 and the differential unit 21 lies on the inclined axis 71 of the rear wheel suspension it will be seen that it is coordinated with the movement of the torsion bar 38 and the diagonal torsion bar 43 during the rising and falling movements of the vehicle wheel.

From the foregoing it will be seen that both torsion bars 38 and 43 serve to support and guide the rear wheel 29 and both also contribute to the spring suspension for the wheel. The two torsion bars provide a variable rate suspension for the rear wheel which is light in weight and economical to manufacture.

It will be understood that the invention is not to be limited to the exact construction shown and described, but that various changes and modifications may be made without departing from the spirit and scope of the invention, as defined in the appended claims.

What is claimed is:

1. In an independent wheel suspension system for a motor vehicle having a frame, a supporting member having means thereon to rotatably mount a road wheel, a longitudinally disposed torsion bar pivotally connected at its forward end to said frame for rotation about a generally horizontal transverse axis and rigidly connected at its rearward end to said supporting member, and a diagonally disposed L-shaped torsion bar having two integrally formed angularly related sections, one of said sections extending generally transversely of the vehicle and rigidly connected at its free end to said supporting member and the other of said sections extending diagonally of the vehicle frame and anchored at its rearward end to said frame, and a bearing on said frame for the last mentioned section of said diagonal torsion bar spaced forwardly of the anchored end thereof.

2. In an independent suspension system for a motor vehicle having a pair of generally parallel longitudinally extending side frame rails interconnectced at their rearward ends by a transversely extending cross frame member, a pair of supporting members one adjacent each side frame rail and each having means thereon to rotatably mount a wheel, a pair of longitudinally extending torsion bars one adjacent each side frame rail and extending generally parallel thereto and pivotally connected at their forward ends to the adjacent frame rail for pivotal movement about general horizontal transverse axes, said longitudinally extending torsion bars being rigidly connected at their rearward ends to said wheel supporting members, and a pair of diagonally extending torsion bars angularly related with respect to each other and crossing each other on the longitudinal center line of the vehicle frame, each of said diagonally extending torsion bars being rigidly connected at its laterally outer end to one of said wheel supporting members, means anchoring the rearward ends of said diagonally extending torsion bars to said cross frame member, and bearing means on said frame journaling said diagonally extending torsion bars at intermediate zones of said bars located forwardly of the point of crossover of said last mentioned bars.

3. The structure defined by claim 2 which is further characterized in that each of said diagonally extending torsion bars is bent intermediate its ends to form two angularly related sections with the forward section extending generally in a transverse direction for attachment to the supporting members and the rearward section extending generally longitudinally at a predetermined angle to the longitudinal center line of the vehicle frame, the axes of the last mentioned sections of the diagonally extending torsion bars if extended passing through the pivotal connections between the forward ends of the longitudinally extending torsion bars and the frame.

4. The structure defined by claim 2 which is further characterized in that the vehicle frame is provided with a second transversely extending cross frame member forwardly of said first mentioned cross frame member, a bracket secured to said last mentioned cross frame member and depending therefrom, the bearing means for said diagonally extending torsion bars being mounted upon said bracket.

5. In a motor vehicle having a frame and a driven road wheel, a driving gear unit mounted upon said frame, a supporting member rotatably mounting said road wheel, an axle drivingly connected to said wheel, a universal joint interconnecting said axle and said driving gear unit, a torsion bar extending generally longitudinally of said vehicle forwardly of said axle and driving gear unit, said torsion bar being secured at its rearward end to said wheel supporting member and pivotally connected at its forward end to said frame for pivotal movement about a generally horizontal transversely extending axis, and a second torsion bar extending diagonally of said vehicle rearwardly of said axle and driving gear unit, said last mentioned torsion bar being anchored at its rearward end upon said frame and secured at its forward end to said wheel supporting member, the pivotal connection between the forward end of said first mentioned torsion bar and said frame and the center of said universal joint being in alignment with the axis of the rearward portion of the second mentioned diagonally extending torsion bar.

References Cited in the file of this patent
UNITED STATES PATENTS 2,624,592   MacPherson _____ Jan. 6, 1953